United States Patent
Agiwal et al.

(10) Patent No.: US 11,153,847 B2
(45) Date of Patent: Oct. 19, 2021

(54) METHOD AND APPARATUS OF PAGING TRANSMISSION AND RECEPTION, SYSTEM INFORMATION WINDOW DETERMINATION AND UPLINK CARRIER SELECTION

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/669,021

(22) Filed: Oct. 30, 2019

(65) Prior Publication Data

US 2020/0137718 A1   Apr. 30, 2020

Related U.S. Application Data

(60) Provisional application No. 62/752,953, filed on Oct. 30, 2018, provisional application No. 62/757,050, filed on Nov. 7, 2018.

(51) Int. Cl.
*H04W 4/00* (2018.01)
*H04W 68/02* (2009.01)
(Continued)

(52) U.S. Cl.
CPC ......... *H04W 68/02* (2013.01); *H04W 72/042* (2013.01); *H04W 76/27* (2018.02)

(58) Field of Classification Search
CPC ........... H04W 72/042; H04W 72/0453; H04W 74/0833; H04W 76/27; H04W 72/04;
(Continued)

(56) References Cited

U.S. PATENT DOCUMENTS

2018/0124687 A1   5/2018   Park et al.
2018/0317198 A1   11/2018  Lee et al.
(Continued)

FOREIGN PATENT DOCUMENTS

| KR | 10-2018-0089400 A | 8/2018 |
|---|---|---|
| WO | 2018/144873 A1 | 8/2018 |
| WO | 2019031913 A1 | 2/2019 |

OTHER PUBLICATIONS

NTT Docomo, Inc., "Maintenance for Physical downlink control channel", 3GPP TSG RAN WG1 Meeting #94bis, Oct. 8-12, 2018, R1-1811373, 18 pages.
(Continued)

*Primary Examiner* — Khalid W Shaheed

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and apparatus for paging transmission and reception, SI window determination and UL carrier selection.

16 Claims, 13 Drawing Sheets

(51) Int. Cl.
*H04W 76/27* (2018.01)
*H04W 72/04* (2009.01)

(58) Field of Classification Search
CPC ............. H04W 24/08; H04W 72/1289; H04W 56/001; H04W 76/11; H04W 72/0446
See application file for complete search history.

(56) References Cited

U.S. PATENT DOCUMENTS

| | | | | |
|---|---|---|---|---|
| 2019/0149305 | A1* | 5/2019 | Zhou | H04B 7/0626 370/330 |
| 2019/0394776 | A1* | 12/2019 | Lee | H04W 72/0453 |
| 2020/0084773 | A1* | 3/2020 | Li | H04W 56/001 |
| 2020/0092861 | A1* | 3/2020 | Xu | H04L 5/0032 |
| 2020/0106573 | A1* | 4/2020 | Cirik | H04W 74/0833 |

OTHER PUBLICATIONS

"3rd Generation Partnership Project; Technical Specification Group Radio Access Network; NR; Radio Resource Control (RRC) protocol specification (Release 15)", 3GPP TS 38.331 V15.3.0 (Sep. 2018), 445 pages.
International Search Report dated Feb. 3, 2020 in connection with International Patent Application No. PCT/KR2019/014389, 3 pages.
Written Opinion of the International Searching Authority dated Feb. 3, 2020 in connection with International Patent Application No. PCT/KR2019/014389, 4 pages.
Supplementary European Search Report dated Sep. 9, 2021, in connection with European Application No. 19880682.0, 12 pages.
Huawei, et al., "CR for TS38.331 on option2 for 6-1 UEs," R2-1813656, 3GPP TSG-RAN WG2 Meeting 103bis, Chengdu, China, Oct. 8-12, 2018, 8 pages.
MediaTek Inc., "Remaining Details on Bandwidth Part Operation in NR," R1-1718327, 3GPP TSG RAN WG1 Meeting 90bis, Prague, CZ, Oct. 9-13, 2017, 13 pages.
Samsung Electronics, "Correction to description of default and non-default association for paging," R2-1813687, 3GPP TSG-RAN2 103bis, Chengdu, China, Oct. 8-12, 2018, 4 pages.
Samsung Electronics, "Correction to configuration of firstPDCCH-MonitoringOccasionOfPO," R2-1816451, 3GPP TSG-RAN2 104, Spokane, USA, Nov. 12-16, 2018, 4 pages.
Samsung, "Report of Offline Discussion #108—Extended PO for Paging in NR-U," R2-1911792, 3GPP TSG-RAN2 107, Prague, Czech Republic, Aug. 26-30, 2019, 6 pages.

* cited by examiner

METHOD AND APPARATUS OF PAGING TRANSMISSION AND RECEPTION, SYSTEM INFORMATION WINDOW DETERMINATION AND UPLINK CARRIER SELECTION

CROSS-REFERENCE TO RELATED APPLICATIONS

This application claims the benefit of Provisional Application No. 62/752,953, filed Oct. 30, 2018 and Provisional Application No. 62/757,050, filed Nov. 7, 2018, the disclosures of which are incorporated by reference herein in their entirety.

BACKGROUND

1. Field

The disclosure relates to a wireless communication system. Specifically, the disclosure relates to an apparatus, a method and a system of paging transmission and reception, system information window determination and uplink carrier selection in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, there have been various studies on paging, system information acquisition, uplink carrier selection in 5G communication system recently.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method of receiving a paging by a terminal is provided. The method comprises: receiving, from a base station, a system information block (SIB) including at least one parameter for a paging; receiving, from the base station, a message configuring a downlink bandwidth part (BWP), the message including information indicating a first physical downlink control channel (PDCCH) monitoring occasion for a paging occasion (PO) of a paging frame (PF) on the downlink BWP; and receiving, from the base station, a paging message on the downlink BWP based on the at least one parameter and the information.

In accordance with another aspect of the disclosure, a method of transmitting a paging by a base station is provided. The method comprises: transmitting, to a terminal, a system information block (SIB) including at least one parameter for a paging; transmitting, to the terminal, a message configuring a downlink bandwidth part (BWP), the message including information indicating a first physical downlink control channel (PDCCH) monitoring occasion for a paging occasion (PO) of a paging frame (PF) on the downlink BWP; and transmitting, to the terminal, a paging message on the downlink BWP based on the at least one parameter and the information.

In accordance with another aspect of the disclosure, a terminal of receiving a paging is provided. The terminal comprises: a transceiver configured to transmit and receive a signal; and a controller configured to: receive, from a base station, a system information block (SIB) including at least one parameter for a paging, receive, from the base station, a message configuring a downlink bandwidth part (BWP), the message including information indicating a first physical downlink control channel (PDCCH) monitoring occasion for a paging occasion (PO) of a paging frame (PF) on the downlink BWP, and receive, from the base station, a paging message on the downlink BWP based on the at least one parameter and the information.

In accordance with another aspect of the disclosure, a base station of transmitting a paging is provided. The base station comprises: a transceiver configured to transmit and receive a signal; and a controller configured to: transmit, to a terminal, a system information block (SIB) including at least one parameter for a paging, transmit, to the terminal, a message configuring a downlink bandwidth part (BWP), the message including information indicating a first physical downlink control channel (PDCCH) monitoring occasion for a paging occasion (PO) of a paging frame (PF) on the downlink BWP, and transmit, to the terminal, a paging message on the downlink BWP based on the at least one parameter and the information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
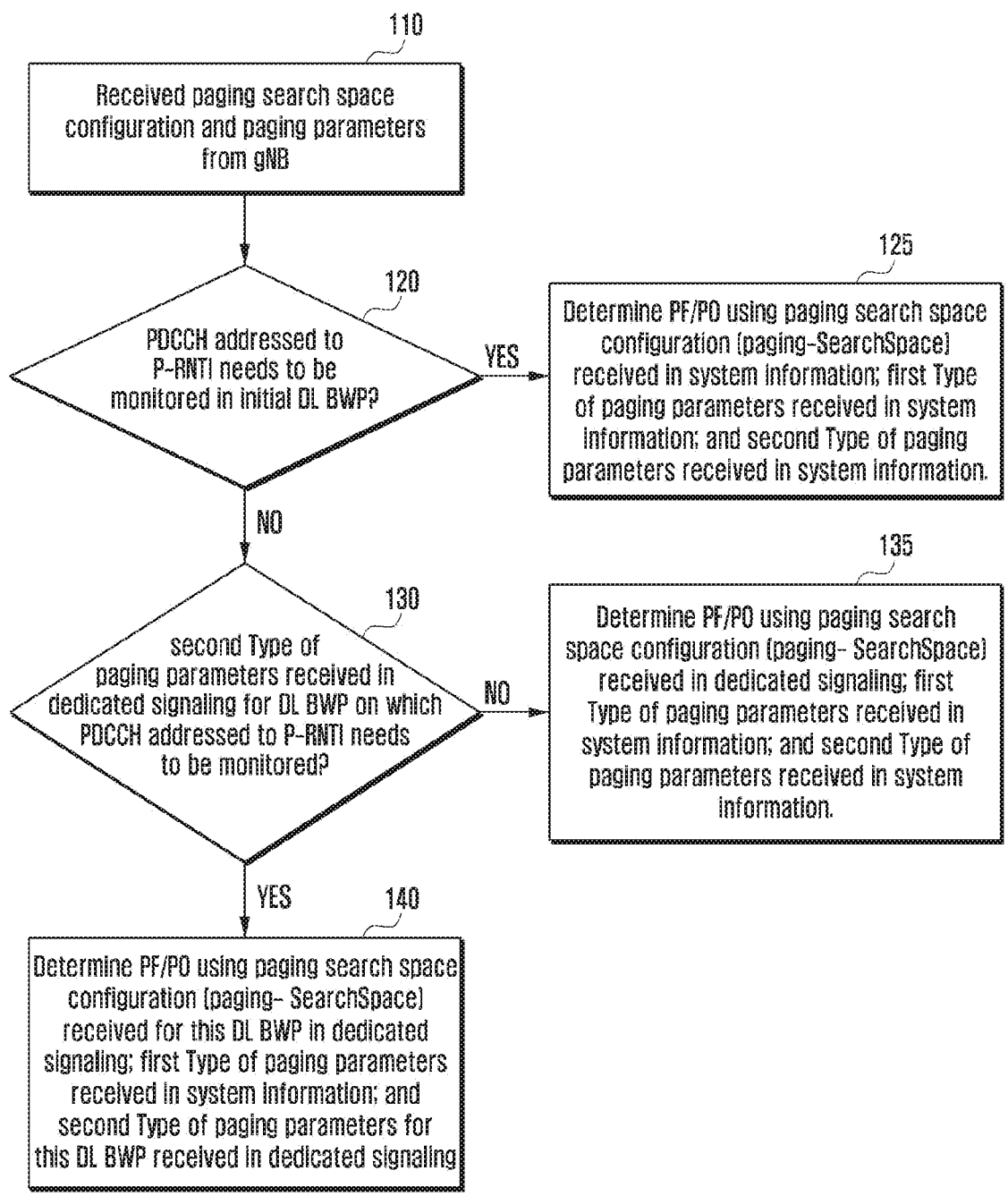
FIG. 1 illustrates determining paging frame (PF) and paging occasion (PO) according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive MIMO, Full Dimensional MIMO, array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the wireless communication system, a base station in a cell broadcasts system information. System information includes common parameters needed for a UE to communicate in cell. In the fifth generation wireless communication system (also referred as next generation radio, new radio or NR), System Information (SI) is divided into the master information block (MIB) and a number of system information blocks (SIBs) where:
  the MIB is always transmitted on the broadcast channel (BCH) with a periodicity of 80 ms and repetitions made within 80 ms and it includes parameters that are needed for the UE to acquire SIB1 from the cell.
  the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to system information (SI) message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. SIBs having the same periodicity can be mapped to the same SI message.

In the 5th generation wireless communication system the paging is transmitted to page UE which are attached to the wireless communication network but are in idle/inactive mode. In the idle/inactive mode UE wake ups at regular intervals (i.e. every paging discontinuous reception (DRX) cycle) for short periods to receive paging and other broadcast information. The network may configure several paging occasions (POs) in a DRX cycle. In a PO, a paging message is transmitted using physical downlink shared channel (PDSCH). A physical downlink common control channel (PDCCH) is addressed to paging radio network temporary identifier (P-RNTI) if there is a paging message in the PDSCH. The P-RNTI is common for all UEs. So UE identity (i.e. serving temporary mobile subscriber identity (S-TMSI)) is included in the paging message to indicate paging for a specific UE. The paging message may include multiple UE identities to page multiple UEs. The paging message is broadcasted (i.e. PDCCH is masked with P-RNTI) over a data channel (i.e. PDSCH).

The UE monitors one PO every DRX cycle. Each PO is a set of 'S' PDCCH monitoring occasions, where 'S' is the number of transmitted synchronization signal blocks (SSBs) in cell. UE determines its PO based on UE identity (ID). The UE first determines the paging frame (PF) and then determines the PO with respect to the determined PF. One PF is a radio frame (10 ms).

The PF for a UE is the radio frame with system frame number 'SFN' which satisfies the equation (SFN+PF_offset) mod T=(T div N)*(UE_ID mod N); where PF_offset, T and N is signaled by gNB in system information. UE monitors (i_s+1)th PO, where i_s=floor(UE_ID/N) mod Ns; where N and Ns is signaled by gNB in system information.

Paging search space signaled by the base station indicates the PDCCH monitoring occasions for paging. Paging search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP wherein each coreset configuration is uniquely identified by an identifier.

The PDCCH monitoring occasions for paging which are not overlapping with UL symbols are sequentially numbered from zero starting from the 1st PDCCH monitoring occasion for paging in the PF. The PDCCH monitoring occasions are determined based on paging search space configuration signaled by gNB in system information. The gNB may signal parameter firstPDCCH-MonitoringOccasionOfPO for each PO corresponding to a PF. When firstPDCCH-MonitoringOccasionOfPO is signaled, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging. 'S' is the number of actual transmitted SSBs determined according to parameter ssb-PositionsInBurst in SIB1.

In fifth generation wireless communication system, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP).

An initial DL BWP is indicated by parameters in MIB. An initial DL BWP is defined by a location and number of contiguous PRBs, starting from a PRB with the lowest index and ending at a PRB with the highest index among PRBs of a CORESET for Type0-PDCCH CSS set. PRBs of CORESET for Type0-PDCCH CSS set is indicated by parameter pdcch-ConfigSIB1 in MIB. The SCS of initial DL BWP is also indicated in MIB. The cyclic prefix for PDCCH reception in the CORESET for Type0-PDCCH CSS set is normal cyclic prefix. Initial DL BWP can also be indicated by parameter initialDownlinkBWP in SIB1. System information and paging is transmitted by the base station in an initial downlink (DL) BWP. A UE in an RRC IDLE/INACTIVE state receives the system information and paging in initial DL BWP. Initial UL BWP is indicated by parameter initialUplinkBWP in SIB1. If the UE is configured with a supplementary UL carrier, the UE can be provided an initial UL BWP on the supplementary UL carrier.

In a radio resource control (RRC) connected state, the UE is configured with one or more DL and uplink (UL) BWPs, for each configured Serving Cell (i.e. primary cell (PCell) or secondary cell (SCell)) via RRC signaling. There can be up to 4 configured DL and UL BWPs. For each configured DL or UL BWPs, the UE is provided with SCS, cyclic prefix, information about the PRBs, BWP Id, a set of common and dedicated parameters. Any DL BWP other than initial DL BWP is also referred as non-initial DL BWP. Any UL BWP other than initial UL BWP is also referred as non-initial UL BWP. For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the medium access control (MAC)

entity itself upon initiation of Random Access procedure. Upon addition of special cell (SpCell) or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer, UE switch to the active DL BWP to the default DL BWP or initial DL BWP (if default DL BWP is not configured). Note that in RRC connected state, an active DL BWP can be initial DL BWP. An active UL BWP can be initial UL BWP.

[Issue 1: Paging in Multiple BWPs]

In the RRC Connected state, the active DL BWP of UE can be different than the initial DL BWP. As a result, UE should be able to receive the paging in its active DL BWP. Paging needs to be transmitted by gNB not only in initial DL BWP but also in other DL BWP(s) which is non-initial DL BWP. In the current design the parameters (T, PF_OFFSET, N, Ns and firstPDCCH-MonitoringOccasionOfPO) to determine the PF/PO for paging reception are broadcasted only in initial DL BWP. This design is not efficient for supporting paging in multiple BWPs. The starting PDCCH occasion number of PO indicated by 'firstPDCCH-MonitoringOccasionOfPO' broadcasted in SIB1 is not always valid for other DL BWPs as the number of PDCCH monitoring occasions for paging and subcarrier spacing (SCS) can be different for different DL BWPs. Let's say N=T, Initial DL BWP SCS=30 kHz, another DL BWP SCS=15 kHz. SIB 1 indicates that starting PDCCH occasion number is 270. The range of values for PDCCH occasion number for SCS of 15 KHz is 0 to 139. 270 is not a valid value.

[Issue 2: SI Window Determination for Multiple BWPs]

Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. When acquiring an SI message, the UE determines the start of the SI-window for the concerned SI message as follows:

for the concerned SI message, the UE determines the number n which corresponds to the order of entry in the list of SI messages configured by schedulingInfoList in si-SchedulingInfo in SIB1;

the UE determines the integer value x=(n−1)*w, where w is the si-WindowLength; si-WindowLength in units of slots is signaled in SIB1.

the SI-window starts at the slot #a, where a=x mod N, in the radio frame for which SFN mod T=FLOOR(x/N), where T is the si-Periodicity of the concerned SI message and N is the number of slots in a radio frame;

The UE in RRC Idle/inactive receives SI in initial DL BWP. However in the RRC connected state, the UE receives SI in its active DL BWP. The active DL BWP may not always be initial DL BWP. From network point of view SI can be transmitted in not only initial DL BWP but also other DL BWPs. In the current design how to determine the slot length and hence number of slots in a radio frame for SI message acquisition is undefined.

[Issue 3: Measurement for UL Carrier Selection]

Multiple UL carriers (referred a normal uplink carrier (NUL) and supplementary uplink carrier (SUL)) can be supported in a cell. When the random access procedure is initiated by the UE, it selects one UL carrier and perform physical random access channel (PRACH) transmission(s) on this UL carrier. According to current design, if the reference signal received power (RSRP) of the downlink pathloss reference is less than a configured threshold, SUL is selected. Otherwise NUL is selected. However, it is not defined how to measure RSRP to select uplink carrier.

Hereinafter, various embodiments according to the disclosure are explained in detail to overcome above mentioned issues.

Embodiment 1—Paging Transmission and Reception

Embodiment 1-1

FIG. 1 illustrates determining paging frame (PF) and paging occasion (PO) according to an embodiment of the disclosure.

In an embodiment of the disclosure, it is proposed that paging channel configuration comprising of parameters Default Paging Cycle Duration, N, Ns, PF_Offset and firstPDCCH-MonitoringOccasionOfPO are categorized into first Type of paging parameters and second Type of paging parameters. The first Type of paging parameters comprises of: Default Paging Cycle Duration, N, Ns and PF_Offset. N is the number of paging frames in paging cycle. Ns is the number of paging occasions per paging frame. The second Type of paging parameters comprises of firstPDCCH-MonitoringOccasionOfPO. firstPDCCH-MonitoringOccasionOfPO indicates starting PDCCH monitoring occasion number for each PO of PF.

According to the embodiment, the first type of paging parameters are transmitted by gNB in system information (e.g. in SIB 1). The second type of paging parameters are transmitted by gNB in system information (e.g. in SIB 1). The second type of paging parameters are transmitted in BWP configuration of each DL BWP in which paging is transmitted (i.e. in each DL BWP in which paging search space is configured), where BWP configuration is included in dedicated signaling using RRC message (e.g. RRCReconfiguration message). The advantage is that gNB can configure starting PDCCH monitoring occasion number of each PO depending on SCS and number of PDCCH monitoring occasions of a BWP.

In an alternate embodiment, the first Type of paging parameters comprise Default Paging Cycle Duration, N and Ns. The second Type of paging parameters comprise firstPDCCH-MonitoringOccasionOfPO and PF_Offset.

In an alternate embodiment, the first Type of paging parameters comprise Default Paging Cycle Duration and N. The second Type of paging parameters comprise firstPDCCH-MonitoringOccasionOfPO, Ns and PF_Offset.

In an alternate embodiment, the first Type of paging parameters comprise Default Paging Cycle Duration. The second Type of paging parameters comprise firstPDCCH-MonitoringOccasionOfPO, N, Ns and PF_Offset.

First, the UE receives paging search space configuration and paging parameters from gNB (110). The UE uses the paging search space configuration, first Type of paging parameters and second Type of paging parameters to determine its PF and PO. The second type of paging parameters received from system information is used by UE in initial DL BWP and zero, one or more dedicated BWPs. The second type of paging parameters received from RRC message (e.g. RRCReconfiguration message) and explicitly associated with a specific BWP is used by UE for determining PF/PO in associated BWP.

If the DL BWP in which UE monitors PDCCH addressed to P-RNTI is the initial DL BWP (120), UE uses the following parameters for PF/PO determination (125):

paging search space configuration (indicated by parameter paging-SearchSpace) associated with initial DL BWP. UE in RRC IDLE/INACTIVE state receives paging search space configuration for initial DL BWP in system information (e.g. SIB1). UE in RRC CONNECTED state receives paging search space configuration for initial DL BWP via RRC signaling or system information (e.g. SIB1). Note that SIB1 can be delivered to UE in RRC connected via dedicated signaling as well.

first Type of paging parameters received in system information.

second Type of paging parameters received in system information.

If the DL BWP in which UE monitors PDCCH addressed to P-RNTI is not the initial DL BWP (120), UE uses the following parameters for PF/PO determination (130):

paging search space configuration (indicated by parameter paging-SearchSpace) associated with this DL BWP, received in RRC message (e.g. RRCReconfiguration message).

first Type of paging parameters received in system information.

second Type of paging parameters associated with this DL BWP, if received in RRC message (e.g. RRCReconfiguration message) (140).

second Type of paging parameters received from system information, if second Type of paging parameters associated with this DL BWP is not received in RRC message (e.g. RRCReconfiguration message) (135).

A UE in the RRC IDLE/INACTIVE state monitors paging (i.e. PDCCH addressed to P-RNTI) in initial DL BWP. The purpose of paging monitoring in RRC IDLE/INACTIVE is to receive paging message, SI update indication and emergency notifications. A UE in the RRC CONNECTED state monitors paging in active DL BWP if paging search space is configured in active DL BWP. The UE in the RRC CONNECTED state does not monitor paging in active DL BWP if paging search space is not configured in active DL BWP. The active DL BWP can be initial DL BWP or non-initial DL BWP. Note that the UE in the RRC CONNECTED state does no monitor paging in DL BWP which is not active. The purpose of paging monitoring in RRC IDLE/INACTIVE is to receive SI update indication and emergency notifications.

Based on the determined parameters (as explained above) the UE determines the PF and PO as follows:

The paging frame is the radio frame with SFN which satisfies equation 1 below:

$$(SFN+PF\_offset) \bmod T = (T \text{ div } N)*(UE\_ID \bmod N) \quad \text{[equation 1]}$$

Index (i_s), indicating the start of a set of PDCCH monitoring occasions for the paging DCI, is determined by equation 2 below:

$$i\_s = \text{floor}(UE\_ID/N) \bmod Ns \quad \text{[equation 2]}$$

If paging-SearchSpace is set to zero, Ns is configured either 1 or 2. For Ns=1, there is only one PO which starts from the first PDCCH monitoring occasion for paging in the PF. For Ns=2, PO is either in the first half frame (i_s=0) or the second half frame (i_s=1) of the PF. If paging-SearchSpace is set to zero, PDCCH monitoring occasions for paging are same as the PDCCH monitoring occasions for SIB 1.

If paging-SearchSpace is not set to zero, the UE monitors the (i_s+1)th PO where the first PO starts in the PF. PDCCH monitoring occasions for paging are determined according to search space configuration indicated by paging-SearchSpace. The PDCCH monitoring occasions for paging which are not overlapping with UL symbols are sequentially numbered from zero starting from the 1 st PDCCH monitoring occasion for paging in the PF. When firstPDCCH-MonitoringOccasionOfPO is available, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to ssb-PositionsInBurst in SystemInformationBlock1. The Kth PDCCH monitoring occasion for paging in the PO corresponds to the Kth transmitted SSB.

Meanwhile, the following parameters are used for the calculation of PF and i_s above:

T: DRX cycle of the UE (T is determined by the shortest of the UE specific DRX value, if configured by RRC or upper layers, and a Default Paging Cycle Duration broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Figure 2:
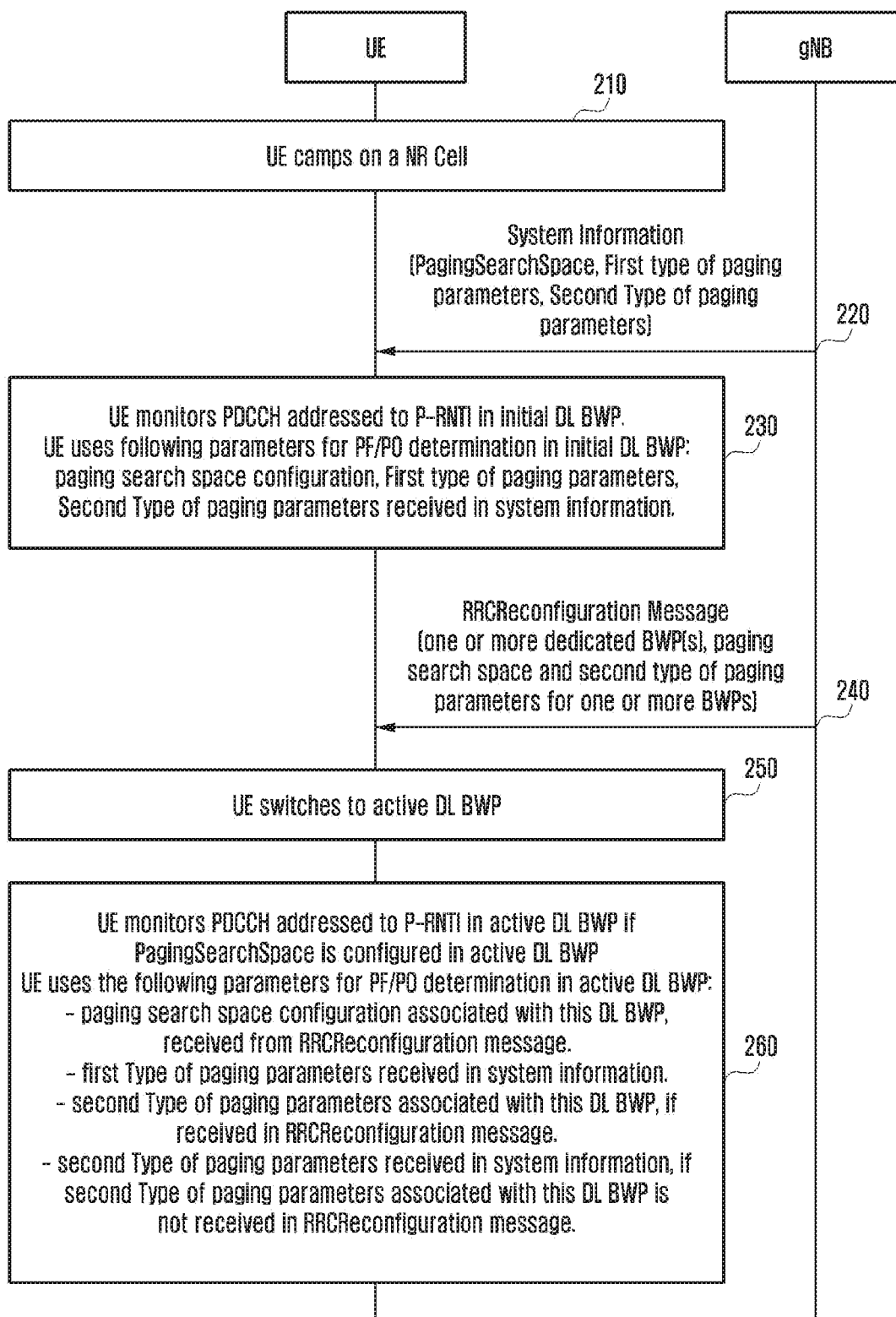
FIG. 2 illustrates determining PF and PO according to another embodiment of the disclosure.

FIG. 2 illustrates determining PF and PO according to another embodiment of the disclosure.

The UE camps on a NR cell (210)

The UE receives system information which contains the paging search space configuration and first type of paging parameters and second type of paging parameters (220).

The UE applies the paging search space and first type of paging parameters and the second type of paging parameters to determine PF/PO in the initial BWP UE monitors PDCCH addressed to P-RNTI in the initial BWP (230).

The UE receives RRC control message which contains configuration information for additional dedicate BWPs (240). Dedicate BWP can be configured with pagingSearchSpace and second type of paging parameters.

The UE switches to active DL BWP and monitors PDCCH addressed to P-RNTI in the active DL BWP if the active DL BWP is configured with paging-SearchSpace (250). Note that upon entering the RRC connected state, the RRC control message indicates the first active DL BWP. Subsequently the active DL BWP can be switched by GNB using PDCCH or RRC signaling.

The UE uses the following parameters for PF/PO determination in active DL BWP (260):

paging search space configuration associated with this DL BWP, received in RRCReconfiguration message.

first Type of paging parameters received in system information.

second Type of paging parameters associated with this DL BWP, if received in RRC RRCReconfiguration message.

second Type of paging parameters received from system information, if second Type of paging parameters associated with this DL BWP is not received in RRCReconfiguration message.

Embodiment 1-2

Figure 3:
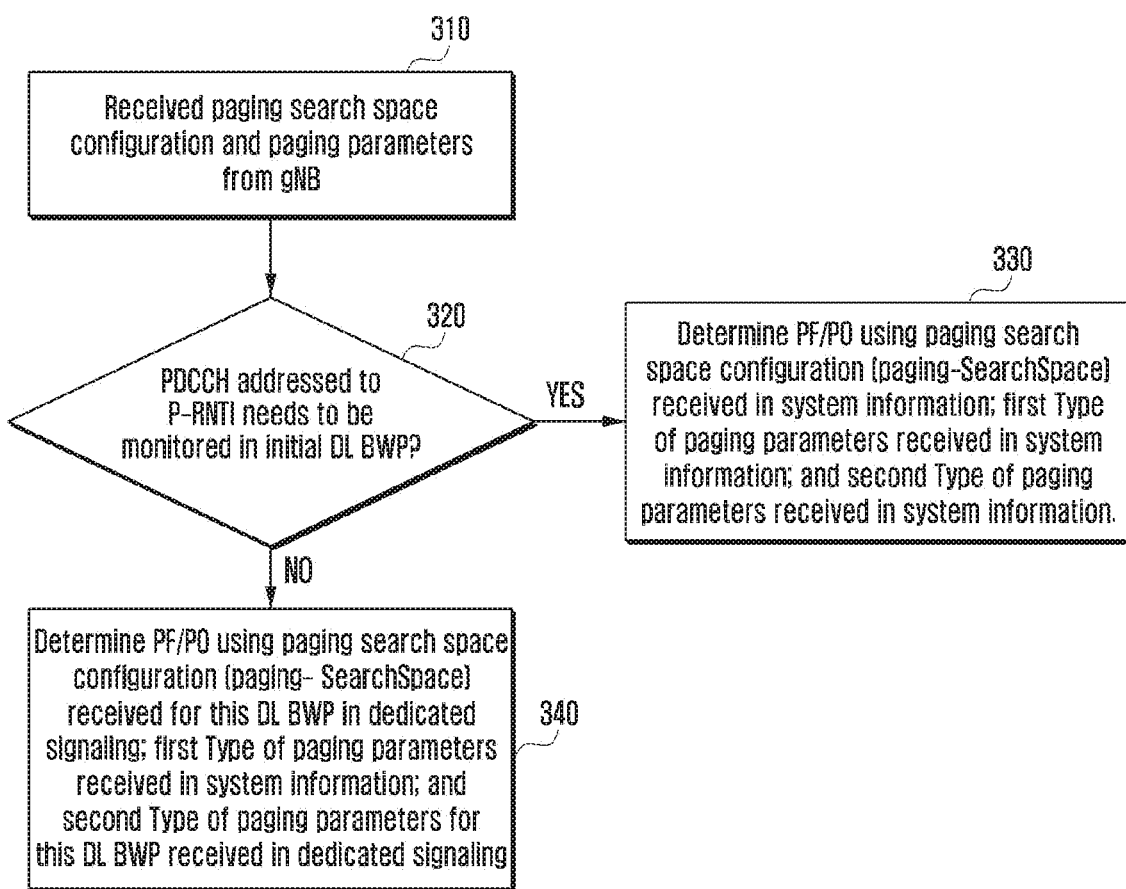
FIG. 3 illustrates determining PF and PO according to another embodiment of the disclosure.

FIG. 3 illustrates determining PF and PO according to another embodiment of the disclosure.

In another embodiment of the disclosure, it is proposed that paging channel configuration comprising of parameters Default Paging Cycle Duration, N, Ns, PF_Offset and firstPDCCH-MonitoringOccasionOfPO are categorized into first Type of paging parameters and second Type of paging parameters. The first Type of paging parameters comprises of: Default Paging Cycle Duration, N, Ns and PF_Offset. N is the number of paging frames in paging cycle. Ns is the number of paging occasions per paging frame. The second Type of paging parameters comprises of firstPDCCH-MonitoringOccasionOfPO. firstPDCCH-MonitoringOccasionOfPO indicates starting PDCCH monitoring occasion number for each PO of PF.

The UE receives paging search space configuration and paging parameters from gNB (310). Here, the first type of paging parameters are transmitted by gNB in system information (e.g. in SIB 1). The second type of paging parameters are transmitted in system information (e.g. in SIB 1). The second type of paging parameters are transmitted in BWP configuration of each non initial DL BWP in which paging is transmitted (i.e. in each non initial DL BWP in which paging search space is configured), where BWP configuration is included in dedicated signaling using RRC message (e.g. RRCReconfiguration message).

The UE uses the paging search space configuration, first Type of paging parameters and second Type of paging parameters to determine its PF and PO. The second type of paging parameters received from system information (i.e. SIB1) is used by UE in initial DL BWP. The second type of paging parameters received from RRC message (e.g. RRCReconfiguration message) and explicitly associated with a specific BWP (i.e. non initial BWP) is used by UE for determining PF/PO in associated BWP i.e., non-initial BWP.

If the DL BWP in which UE monitors PDCCH addressed to P-RNTI is the initial DL BWP (320), UE uses the following parameters for PF/PO determination (330):
  paging search space configuration (indicated by parameter paging-SearchSpace) received in system information (e.g., SIB1)
  first Type of paging parameters received in system information. (e.g., SIB1)
  second Type of paging parameters received in system information. (e.g., SIB1)

If the DL BWP in which UE monitors PDCCH addressed to P-RNTI is not the initial DL BWP i.e., non-initial BWP (320), UE uses the following parameters for PF/PO determination (340):
  paging search space configuration (indicated by parameter paging-SearchSpace) associated with this DL BWP, received in RRC message (e.g. RRCReconfiguration message).
  first Type of paging parameters received in system information.
  second Type of paging parameters associated with this DL BWP Based on the determined parameters (as explained above) UE determines the PF and PO as follows:

The paging frame is the radio frame with SFN which satisfies equation 3 below:

$$(SFN+PF\_offset) \bmod T = (T \text{ div } N)*(UE\_ID \bmod N) \quad \text{[equation 3]}$$

Index (i_s), indicating the start of a set of PDCCH monitoring occasions for the paging DCI, is determined by following equation 4:

$$i\_s = \text{floor}(UE\_ID/N) \bmod Ns \quad \text{[equation 4]}$$

If paging-SearchSpace is set to zero, Ns is configured either 1 or 2. For Ns=1, there is only one PO which starts from the first PDCCH monitoring occasion for paging in the PF. For Ns=2, PO is either in the first half frame (i_s=0) or the second half frame (i_s=1) of the PF. If paging-SearchSpace is set to zero, PDCCH monitoring occasions for paging are same as the PDCCH monitoring occasions for SIB 1.

If paging-SearchSpace is not set to zero, the UE monitors the (i_s+1)th PO where the first PO starts in the PF. PDCCH monitoring occasions for paging are determined according to search space configuration indicated by paging-SearchSpace. The PDCCH monitoring occasions for paging which are not overlapping with UL symbols are sequentially numbered from zero starting from the 1st PDCCH monitoring occasion for paging in the PF.

When firstPDCCH-MonitoringOccasionOfPO is available, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to ssb-PositionsInBurst in SystemInformationBlock1. The Kth PDCCH monitoring occasion for paging in the PO corresponds to the Kth transmitted SSB.

The following parameters are used for the calculation of PF and i_s above:
  T: DRX cycle of the UE (T is determined by the shortest of the UE specific DRX value, if configured by RRC or upper layers, and a Default Paging Cycle Duration broadcast in system information. If UE specific DRX is not configured by RRC or by upper layers, the default value is applied).
  N: number of total paging frames in T
  Ns: number of paging occasions for a PF
  PF_offset: offset used for PF determination
  UE_ID: 5G-S-TMSI mod 1024

Figure 4:
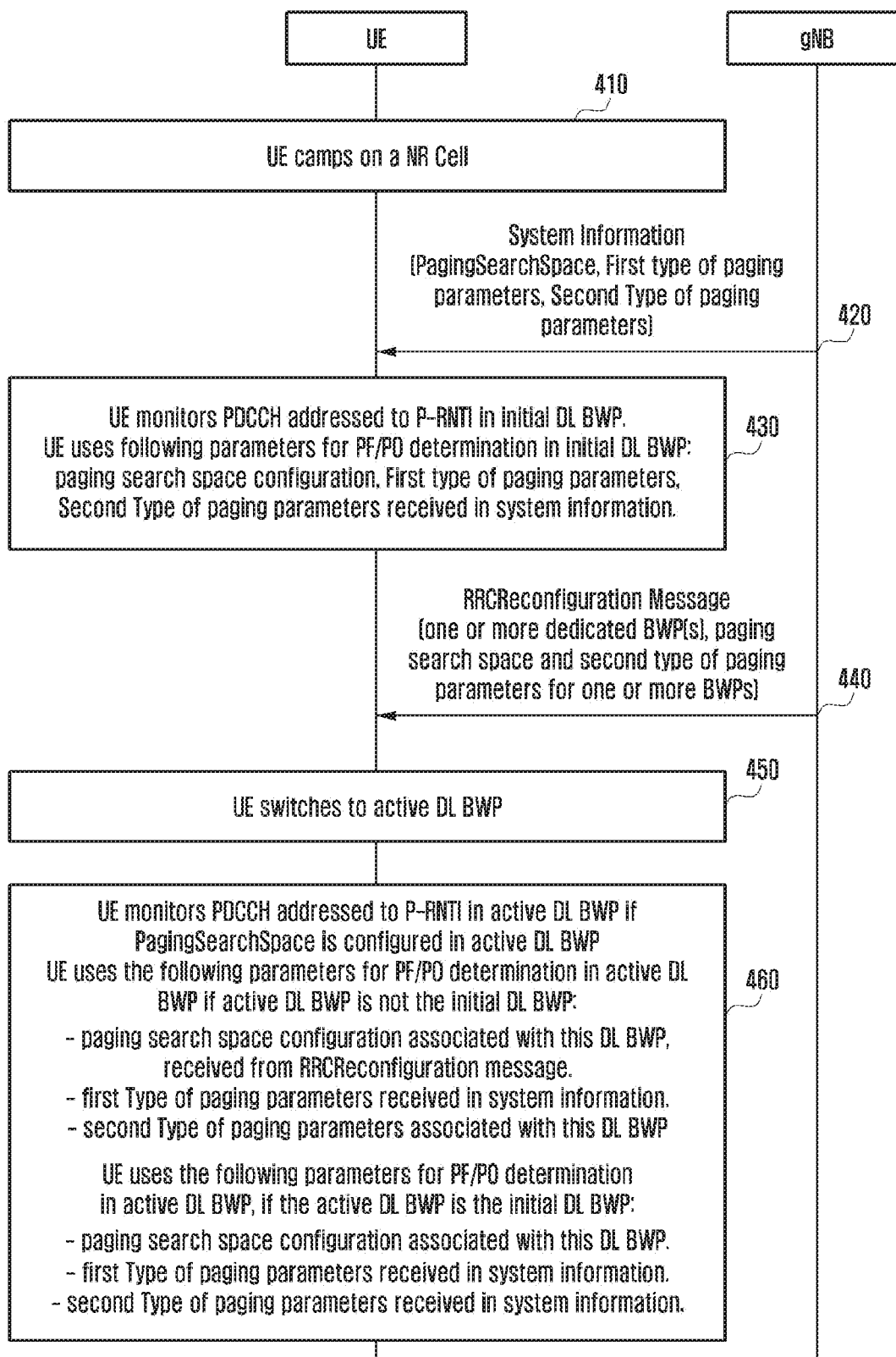
FIG. 4 illustrates determining PF and PO according to another embodiment of the disclosure.

FIG. 4 illustrates determining PF and PO according to another embodiment of the disclosure.

The UE camps on a NR cell (410)
  The UE receives system information which contains the paging search space configuration and first type of paging parameters and second type of paging parameters (420).
  The UE applies the paging search space and first type of paging parameters and the second type of paging parameters to determine PF/PO in the initial BWP. UE monitors PDCCH addressed to P-RNTI in the initial BWP (430).
  The UE receives RRC control message (e.g., RRC reconfiguration message) which contains configuration information for additional dedicate BWPs (440). Dedicate BWP can be configured with pagingSearchSpace and second type of paging parameters.
  The UE switches to active DL BWP and monitors PDCCH addressed to P-RNTI in the active DL BWP if the active DL BWP is configured with paging-SearchSpace (450). Note that upon entering RRC connected state, RRC control message indicates the first active DL BWP. Subsequently the active DL BWP can be switched by GNB using PDCCH or RRC signaling.

The UE uses the following parameters for PF/PO determination in active DL BWP (460) if active DL BWP is not the initial DL BWP:

paging search space configuration associated with this DL BWP, received in RRCReconfiguration message.

first Type of paging parameters received in system information.

second Type of paging parameters associated with this DL BWP

The UE uses the following parameters for PF/PO determination in active DL BWP (460) if the active DL BWP is the initial DL BWP:

paging search space configuration associated with this DL BWP.

first Type of paging parameters received in system information (e.g. SIB1).

second Type of paging parameters received in system information

Embodiment 1-3

Figure 5:
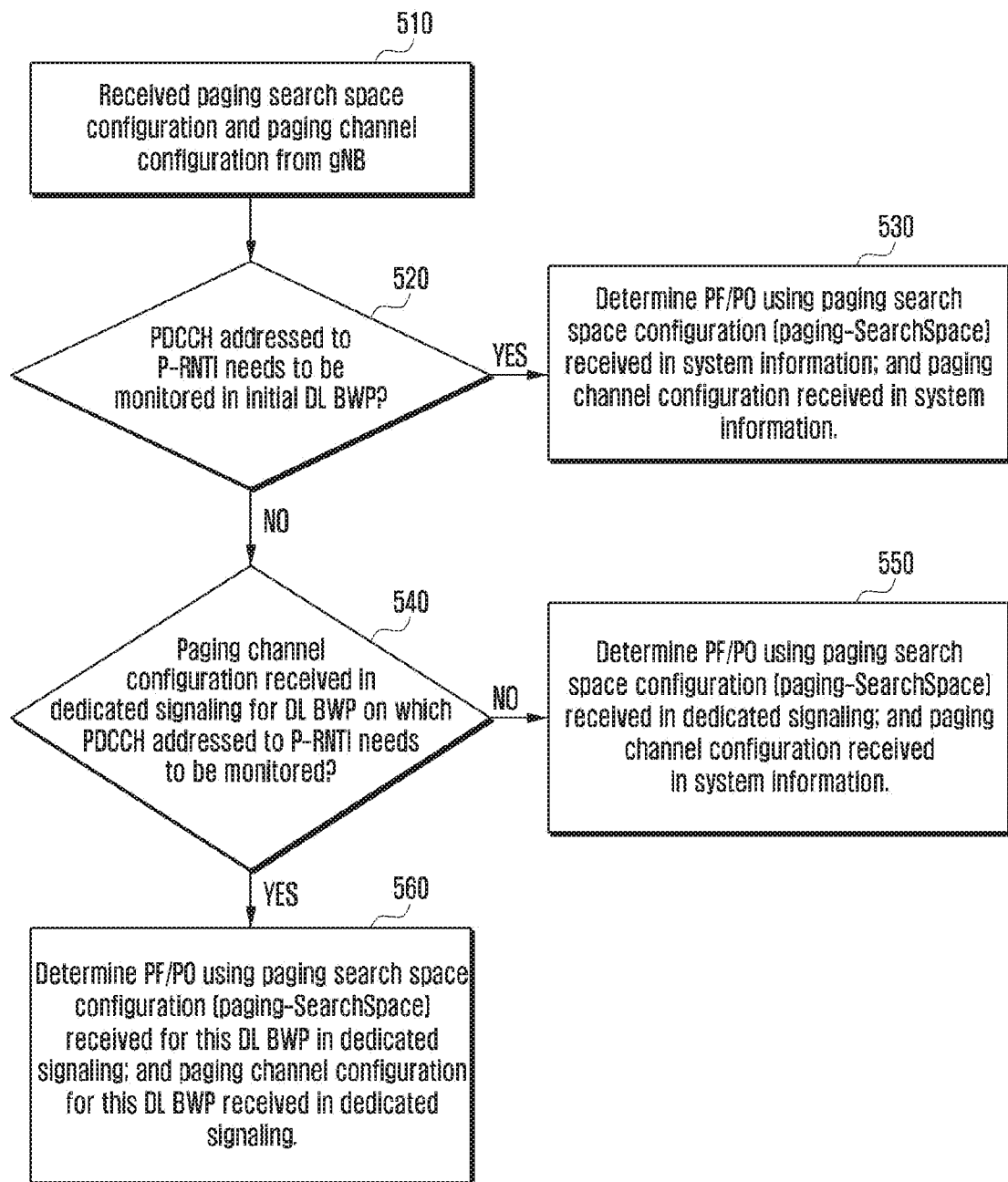
FIG. 5 illustrates determining PF and PO according to another embodiment of the disclosure.

FIG. 5 illustrates determining PF and PO according to another embodiment of the disclosure.

In another embodiment of the disclosure, it is proposed that paging channel configuration comprising of parameters Default Paging Cycle Duration, N, Ns, PF_Offset and firstPDCCH-MonitoringOccasionOfPO is transmitted in system information (e.g. in SIB 1). The paging channel configuration comprising of parameters Default Paging Cycle Duration, N, Ns, PF_Offset and firstPDCCH-MonitoringOccasionOfPO is also transmitted in BWP configuration of each DL BWP in which paging is transmitted (i.e. in each DL BWP in which paging search space is configured), where BWP configuration is included in dedicated signaling using RRC message (e.g. RRCReconfiguration message).

The UE receives paging search space configuration and paging channel configuration from gNB (510). UE uses the paging search space configuration and paging channel configuration to determine its PF and PO. The paging channel configuration received from system information is used by UE in initial DL BWP and zero, one or more dedicated BWPs. The paging channel configuration received from RRC message (e.g. RRCReconfiguration message) and explicitly associated with a specific BWP is used by UE for determining PF/PO in associated BWP.

If the DL BWP in which UE monitors PDCCH addressed to P-RNTI is the initial DL BWP (520), UE uses the following parameters for PF/PO determination (530):

paging search space configuration (indicated by parameter paging-SearchSpace) received in system information paging channel configuration received in system information If the DL BWP in which UE monitors PDCCH addressed to P-RNTI is not the initial DL BWP (520), UE uses the following parameters for PF/PO determination (540):

paging search space configuration (indicated by parameter paging-SearchSpace) associated with this DL BWP, received in RRC message (e.g. RRCReconfiguration message).

paging channel configuration associated with this DL BWP, if received in RRC message (e.g. RRCReconfiguration message) (560).

paging channel configuration received from system information, if paging channel configuration associated with this DL BWP is not received in RRC message (e.g. RRCReconfiguration message) (550).

Based on the determined parameters (as explained above) UE determines the PF and PO as follows:

The paging frame is the radio frame with SFN which satisfies equation 5 below:

$$(SFN+PF\_offset) \bmod T = (T \operatorname{div} N)*(UE\_ID \bmod N) \quad \text{[equation 5]}$$

Index (i_s), indicating the start of a set of PDCCH monitoring occasions for the paging DCI, is determined by equation 6 below:

$$i\_s = \operatorname{floor}(UE\_ID/N) \bmod Ns \quad \text{[equation 6]}$$

If paging-SearchSpace is set to zero, Ns is configured either 1 or 2. For Ns=1, there is only one PO which starts from the first PDCCH monitoring occasion for paging in the PF. For Ns=2, PO is either in the first half frame (i_s=0) or the second half frame (i_s=1) of the PF. If paging-SearchSpace is set to zero, PDCCH monitoring occasions for paging are same as the PDCCH monitoring occasions for SIB 1.

If paging-SearchSpace is not set to zero, the UE monitors the (i_s+1)th PO where the first PO starts in the PF. PDCCH monitoring occasions for paging are determined according to search space configuration indicated by paging-SearchSpace. The PDCCH monitoring occasions for paging which are not overlapping with UL symbols are sequentially numbered from zero starting from the 1st PDCCH monitoring occasion for paging in the PF.

When firstPDCCH-MonitoringOccasionOfPO is available, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to ssb-PositionsInBurst in SystemInformationBlock1. The Kth PDCCH monitoring occasion for paging in the PO corresponds to the Kth transmitted SSB.

The following parameters are used for the calculation of PF and i_s above:

T: DRX cycle of the UE (T is determined by the shortest of the UE specific DRX value, if configured by RRC or upper layers, and a Default Paging Cycle Duration broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Figure 6:
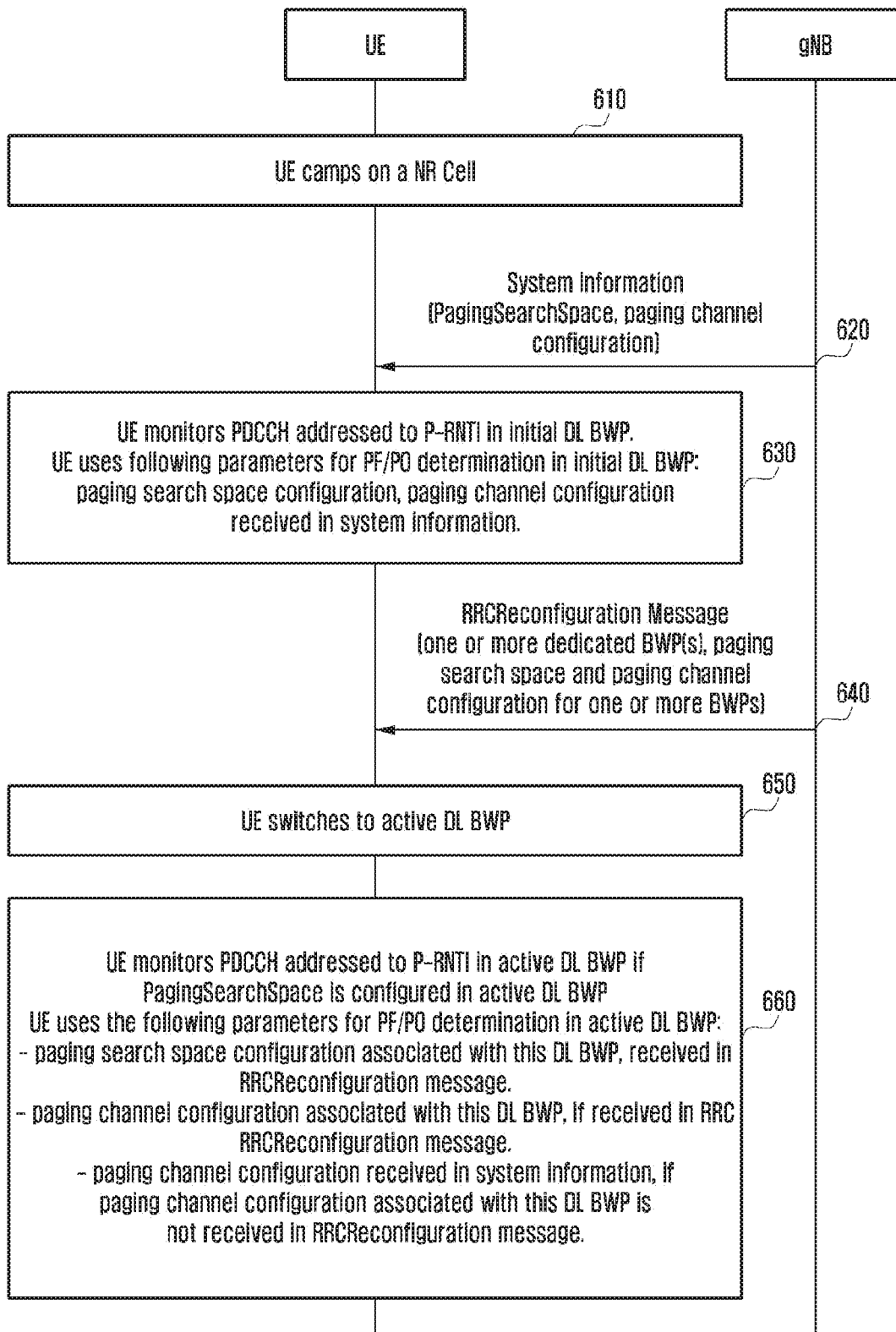
FIG. 6 illustrates determining PF and PO according to another embodiment of the disclosure.

FIG. 6 illustrates determining PF and PO according to another embodiment of the disclosure.

The UE camps on a NR cell (610)

The UE receives system information which contains the paging search space configuration and paging channel configuration (620).

The UE applies the paging search space and paging channel configuration to determine PF/PO in the initial BWP. UE monitors PDCCH addressed to P-RNTI in the initial BWP (630).

The UE receives RRC control message which contains configuration information for additional dedicate BWPs (640). Dedicate BWP can be configured with pagingSearchSpace and paging channel configuration.

The UE switches to active DL BWP and monitors PDCCH addressed to P-RNTI in the active DL BWP if the active DL BWP is configured with paging-SearchSpace (650).

The UE uses the following parameters for PF/PO determination in active DL BWP (660):
- paging search space configuration associated with this DL BWP, received in RRCReconfiguration message.
- paging channel configuration associated with this DL BWP, if received in RRC RRCReconfiguration message.
- paging channel configuration received from system information, if paging channel configuration associated with this DL BWP is not received in RRCReconfiguration message.

Embodiment 1-4

Figure 7:
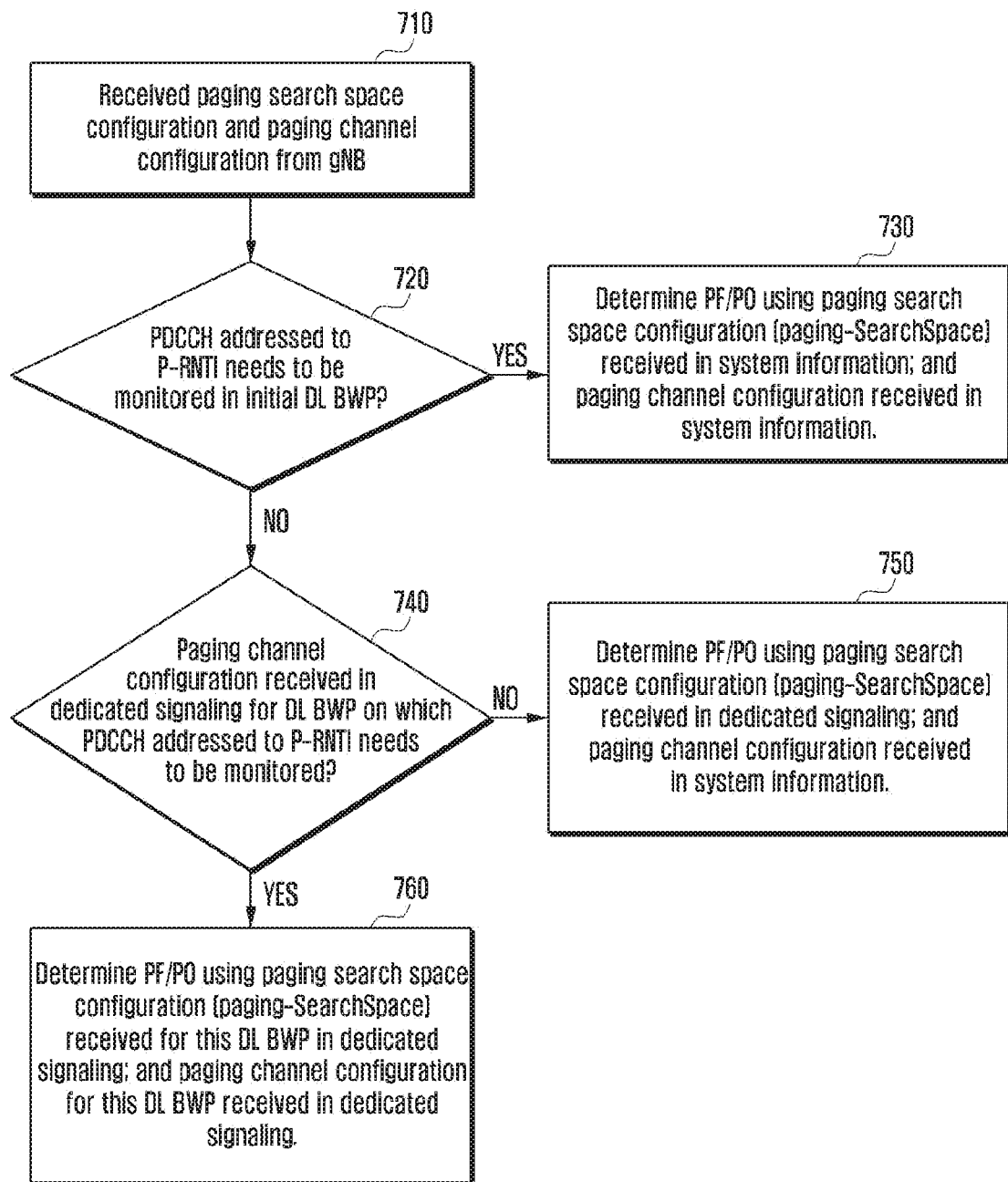
FIG. 7 illustrates determining PF and PO according to another embodiment of the disclosure.

FIG. 7 illustrates determining PF and PO according to another embodiment of the disclosure.

In another embodiment of the disclosure, it is proposed that paging channel configuration comprising of parameters Default Paging Cycle Duration, N, Ns, PF_Offset and firstPDCCH-MonitoringOccasionOfPO is transmitted in system information (e.g. in SIB 1) and The paging channel configuration comprising of parameters Default Paging Cycle Duration, N, Ns, PF_Offset and firstPDCCH-MonitoringOccasionOfPO is also transmitted in BWP configuration of each DL BWP in which paging is transmitted (i.e. in each DL BWP in which paging search space is configured), where BWP configuration is included in dedicated signaling using RRC message (e.g. RRCReconfiguration message).

The UE receives paging search space configuration and paging channel configuration from gNB (710). UE uses the paging search space configuration and paging channel configuration to determine its PF and PO. The paging channel configuration received from system information is used by UE in initial DL BWP. The paging channel configuration received from RRC message (e.g. RRCReconfiguration message) and explicitly associated with a specific BWP is used by UE for determining PF/PO in associated BWP.

If the DL BWP in which UE monitors PDCCH addressed to P-RNTI is the initial DL BWP (720), UE uses the following parameters for PF/PO determination (730):
- paging search space configuration (indicated by parameter paging-SearchSpace) received in system information
- paging channel configuration received in system information If the DL BWP in which UE monitors PDCCH addressed to P-RNTI is not the initial DL BWP (720), UE uses the following parameters for PF/PO determination (740):
- paging search space configuration (indicated by parameter paging-SearchSpace) associated with this DL BWP, received in RRC message (e.g. RRCReconfiguration message) (750, 760).
- paging channel configuration associated with this DL BWP, if paging channel configuration is received in dedicated signaling for this DL BWP (760). Otherwise, paging channel configuration received in system information (750).

Based on the determined parameters (as explained above) UE determines the PF and PO as follows:

The paging frame is the radio frame with SFN which satisfies equation 7 below:

$$(SFN+PF\_offset) \bmod T = (T \text{ div } N)*(UE\_ID \bmod N) \quad \text{[equation 7]}$$

Index (i_s), indicating the start of a set of PDCCH monitoring occasions for the paging DCI, is determined by following equation 8:

$$i\_s = \text{floor}(UE\_ID/N) \bmod Ns \quad \text{[equation 8]}$$

If paging-SearchSpace is set to zero, Ns is configured either 1 or 2. For Ns=1, there is only one PO which starts from the first PDCCH monitoring occasion for paging in the PF. For Ns=2, PO is either in the first half frame (i_s=0) or the second half frame (i_s=1) of the PF. If paging-SearchSpace is set to zero, PDCCH monitoring occasions for paging are same as the PDCCH monitoring occasions for SIB 1.

If paging-SearchSpace is not set to zero, the UE monitors the (i_s+1)th PO where the first PO starts in the PF. PDCCH monitoring occasions for paging are determined according to search space configuration indicated by paging-SearchSpace. The PDCCH monitoring occasions for paging which are not overlapping with UL symbols are sequentially numbered from zero starting from the 1st PDCCH monitoring occasion for paging in the PF.

When firstPDCCH-MonitoringOccasionOfPO is available, the (i_s+1)th PO is a set of 'S' consecutive PDCCH monitoring occasions for paging starting from the PDCCH monitoring occasion indicated by firstPDCCH-MonitoringOccasionOfPO (i.e. the (i_s+1)th value of the firstPDCCH-MonitoringOccasionOfPO parameter). Otherwise, the (i_s+1)th PO is a set of 'S' consecutive PDCCH monitoring occasions for paging starting from the (i_s*S)th PDCCH monitoring occasion for paging where 'S' is the number of actual transmitted SSBs determined according to ssb-PositionsInBurst in SystemInformationBlock1. The Kth PDCCH monitoring occasion for paging in the PO corresponds to the Kth transmitted SSB.

The following parameters are used for the calculation of PF and i_s above:

T: DRX cycle of the UE (T is determined by the shortest of the UE specific DRX value, if configured by RRC or upper layers, and a Default Paging Cycle Duration broadcast in system information. If UE specific DRX is not configured by RRC or by upper layers, the default value is applied).

N: number of total paging frames in T

Ns: number of paging occasions for a PF

PF_offset: offset used for PF determination

UE_ID: 5G-S-TMSI mod 1024

Figure 8:
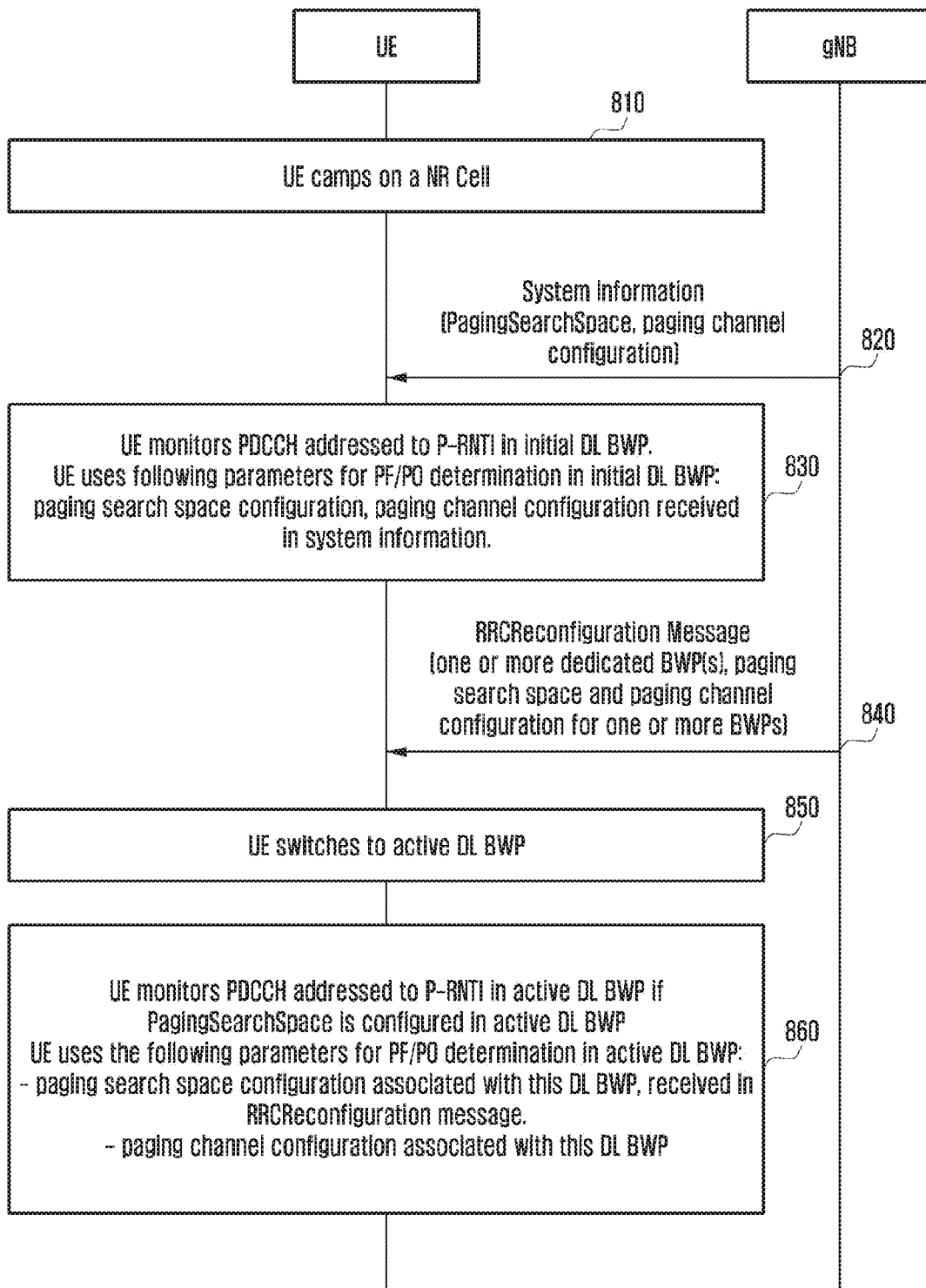
FIG. 8 illustrates determining PF and PO according to another embodiment of the disclosure.

FIG. 8 illustrates determining PF and PO according to another embodiment of the disclosure.

The UE camps on a NR cell (810)

The UE receives system information which contains the paging search space configuration and paging channel configuration (820).

The UE applies the paging search space and paging channel configuration to determine PF/PO in the initial BWP. UE monitors PDCCH addressed to P-RNTI in the initial BWP (830).

The UE receives RRC control message which contains configuration information for additional dedicate BWPs (840). Dedicate BWP can be configured with pagingSearchSpace and paging channel configuration.

The UE switches to active DL BWP and monitors PDCCH addressed to P-RNTI in the active DL BWP if the active DL BWP is configured with paging-SearchSpace (850).

UE uses the following parameters for PF/PO determination in active DL BWP (860):
- paging search space configuration associated with this DL BWP, received in RRCReconfiguration message.

paging channel configuration associated with this DL BWP.

Embodiment 2—SI Window Determination

In the 5th generation wireless communication system, SIBs other than SIB1 are carried in SystemInformation (SI) messages, which are transmitted on the DL-SCH. SIBs having the same periodicity can be mapped to the same SI message. Each SI message is transmitted within periodically occurring time domain windows (referred to as SI-windows with same length for all SI messages).

SI window length (common for all SI messages) and SI periodicity of each SI message is received by UE in SIB 1. UE in RRC Idle/inactive receives SI message(s) in initial DL BWP. However in RRC connected state, UE receives SI message(s) in its active DL BWP if common search space is configured in active DL BWP. The active DL BWP may not always be initial DL BWP.

Embodiment 2-1

Figure 9:
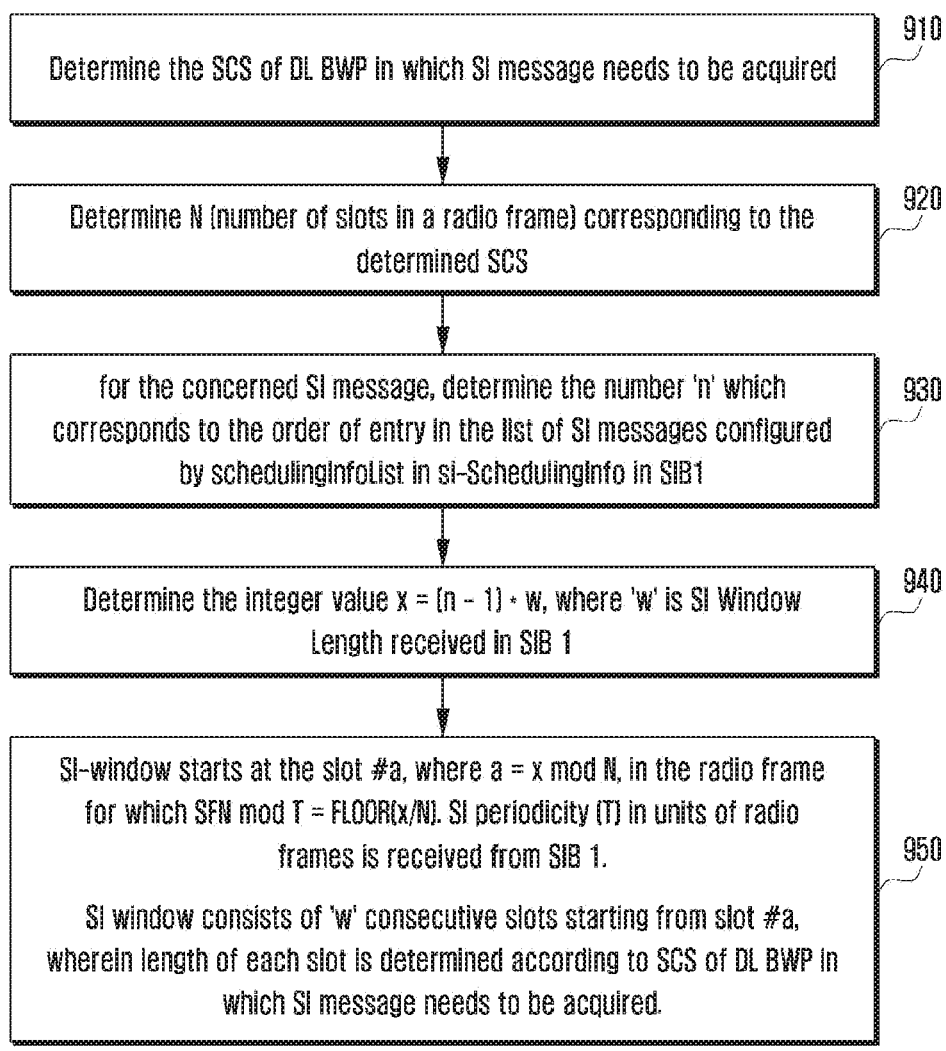
FIG. 9 illustrates determining system information (SI) window according to another embodiment of the disclosure.

FIG. 9 illustrates determining system information (SI) window according to another embodiment of the disclosure.
1. The UE receives, from SIB1, si-WindowLength in units of slots and SI periodicity (T) is units of radio frames.
2. The UE determines the SCS of DL BWP in which SI message needs to be acquired (910).
   The SCS of dedicated DL BWP is received in BWP configuration included in dedicated signaling using RRC message (e.g. RRCReconfiguration message). The SCS of initial DL BWP is received in SIB 1.
3. The UE determines N=number of slots in a radio frame (920)
   A. This is determined based on SCS of DL BWP in which SI message needs to be received by UE. The SCS of dedicated DL BWP is received in BWP configuration included in dedicated signaling using RRC message (e.g. RRCReconfiguration message). The SCS of initial DL BWP is received in SIB 1.
   B. The slot length for each SCS is pre-defined. The number of slots per radio frame for each SCS is pre-defined (10 slots for SCS equals to 15 KHz; 20 slots for SCS equals to 30 KHz; 40 slots for SCS equals to 60 KHz; 80 slots for SCS equals to 120 KHz; 160 slots for SCS equals to 240 KHz).
4. The UE determines for the concerned SI message, the number n which corresponds to the order of entry in the list of SI messages configured by schedulingInfoList in si-SchedulingInfo in SIB1 (930).
5. The UE determine the integer value x=(n−1)*w (940).
6. The SI-window starts at the slot #a, where a=x mod N, in the radio frame for which SFN mod T=FLOOR(x/N), where T is the si-Periodicity of the concerned SI message and N is the number of slots in a radio frame (950).
7. SI window consists of 'w' consecutive slots starting from slot #a, wherein length of each slot is determined according to SCS of DL BWP in which SI message needs to be acquired (950).
   A. The length of each slot is determined based on SCS of DL BWP in which SI message needs to be received by UE. The slot length for each SCS is pre-defined (1 ms for SCS equals to 15 kHz; 0.5 ms for SCS equals to 30 kHz; 0.25 ms for SCS equals to 60 kHz; 0.125 ms for SCS equals to 120 kHz).
   B. The SCS of dedicated DL BWP is received in BWP configuration included in dedicated signaling using RRC message (e.g. RRCReconfiguration message). The SCS of initial DL BWP is received in SIB 1.
   C. In this method SI window length 'w' in units of slots is same for any DL BWP in which SI message is acquired. However absolute duration in milliseconds can be different for different DL BWP as the duration of each slot depends on SCS which can be different for different BWP.

The UE then acquires the concerned SI message in one or more SI window(s) of SI message.

Embodiment 2-2

Figure 10:
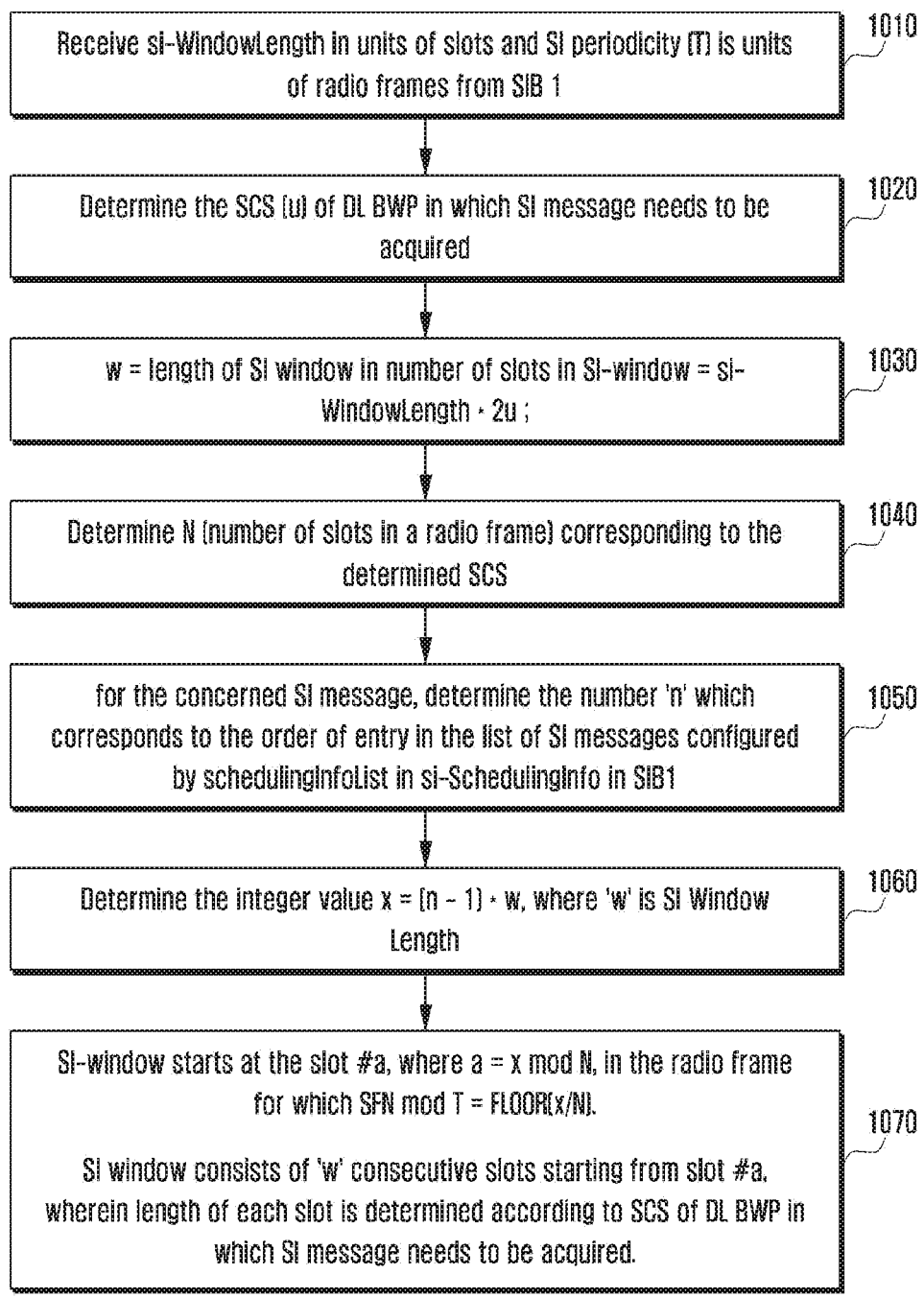
FIG. 10 illustrates determining SI window according to another embodiment of the disclosure.

FIG. 10 illustrates determining SI window according to another embodiment of the disclosure.
1. The UE receives si-WindowLength in units of slots and SI periodicity (T) is units of radio frames from SIB 1 (1010).
2. The UE determine the SCS (u) of DL BWP in which SI message needs to be acquired (1020).
   The SCS of dedicated DL BWP is received in BWP configuration included in dedicated signaling using RRC message (e.g. RRCReconfiguration message). The SCS of initial DL BWP is received in SIB 1.
3. The UE determines w=length of SI window in number of slots in SI-window=si-WindowLength*2u, 'u' is the SCS index of SCS of DL BWP in which SI needs to be received. si-WindowLength is received in SIB 1 (1030).
   A. 'u' equals zero for SCS of 15 KHz; 'u' equals one for SCS of 30 KHz; 'u' equals two for SCS of 60 KHz; 'u' equals three for SCS of 120 KHz; 'u' equals four for SCS of 240 KHz;
   B. Length of each slot is determined based on SCS of DL BWP in which SI message needs to be received by UE. The slot length for each SCS is pre-defined (1 ms for SCS equals to 15 KHz; 0.5 ms for SCS equals to 30 KHz; 0.25 ms for SCS equals to 60 KHz; 0.125 slots for SCS equals to 120 KHz).
   C. The SCS of dedicated DL BWP is received in BWP configuration included in dedicated signaling using RRC message (e.g. RRCReconfiguration message). The SCS of initial DL BWP is received in SIB 1.
   D. In this method si-WindowLength in units of slots is configured for a reference SCS of 15 KHz.
4. The UE determine N=number of slots in a radio frame (1040)
   A. This is determined based on SCS of DL BWP in which SI message needs to be received by UE. The SCS of dedicated DL BWP is received in BWP configuration included in dedicated signaling using RRC message (e.g. RRCReconfiguration message). The SCS of initial DL BWP is received in SIB 1.
   B. The slot length for each SCS is pre-defined. The number of slots per radio frame for each SCS is pre-defined (10 slots for SCS equals to 15 KHz; 20 slots for SCS equals to 30 KHz; 40 slots for SCS equals to 60 KHz; 80 slots for SCS equals to 120 KHz; 160 slots for SCS equals to 240 KHz).
5. The UE determines for the concerned SI message, the number n which corresponds to the order of entry in the list of SI messages configured by schedulingInfoList in si-SchedulingInfo in SIB 1 (1050);
6. The UE determine the integer value x=(n−1)*w (1060).
7. SI window consists of 'w' consecutive slots starting from slot #a, wherein length of each slot is determined according to SCS of DL BWP in which SI message needs to be acquired (1070).

A. The length of each slot is determined based on SCS of DL BWP in which SI message needs to be received by UE. The slot length for each SCS is pre-defined (1 ms for SCS equals to 15 KHz; 0.5 ms for SCS equals to 30 KHz; 0.25 ms for SCS equals to 60 KHz; 0.125 slots for SCS equals to 120 KHz).

B. The SCS of dedicated DL BWP is received in BWP configuration included in dedicated signaling using RRC message (e.g. RRCReconfiguration message). The SCS of initial DL BWP is received in SIB 1.

C. In this method SI window length 'w' in units of slots is same for any DL BWP in which SI message is acquired. However absolute duration in milliseconds can be different for different DL BWP as the duration of each slot depends on SCS which can be different for different BWP.

The UE then acquires the concerned SI message in one or more SI window(s) of SI message.

Embodiment 2-3

Figure 11:
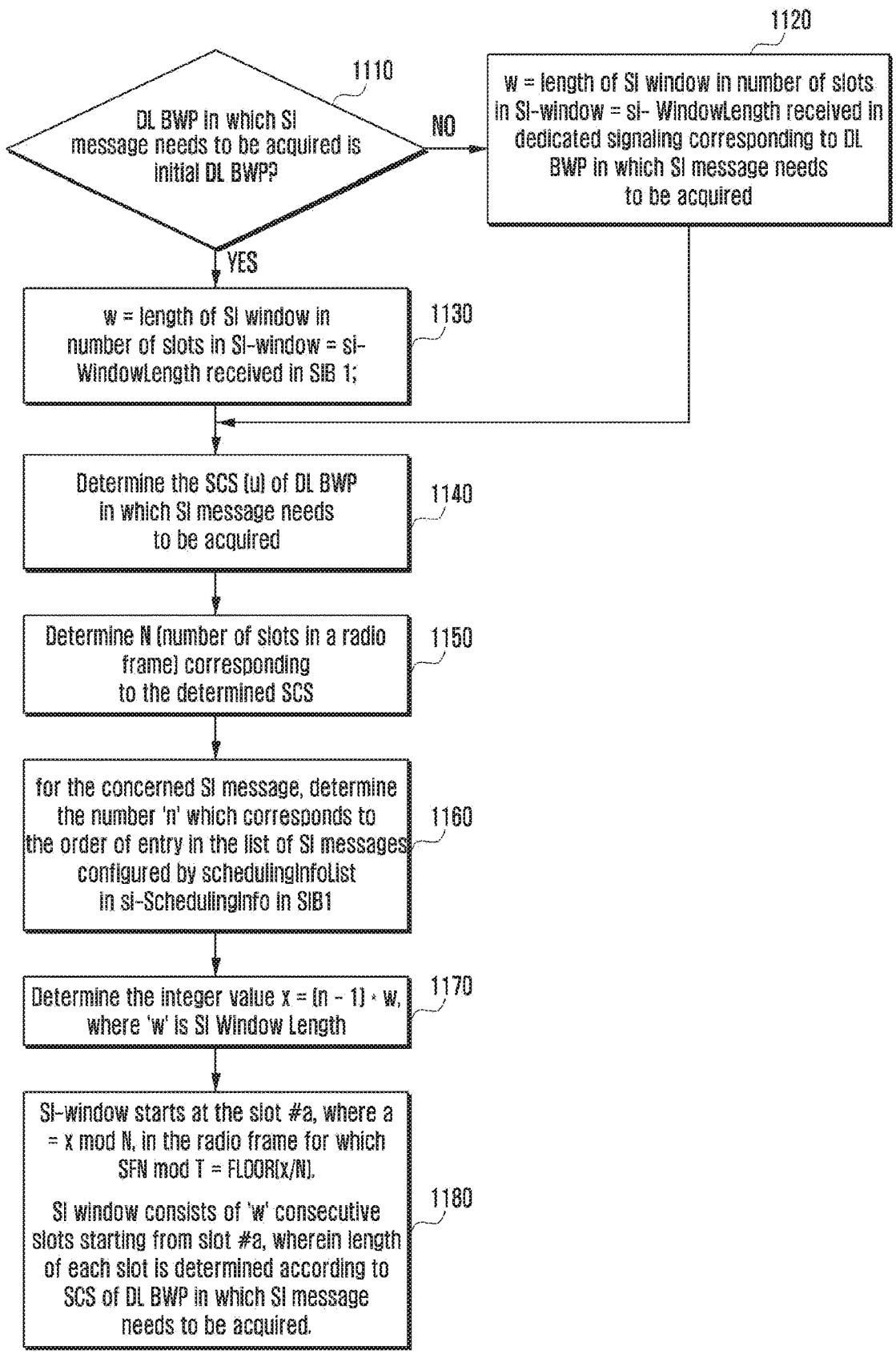
FIG. 11 illustrates determining SI window according to another embodiment of the disclosure.

FIG. 11 illustrates determining SI window according to another embodiment of the disclosure.

1. The UE receives si-WindowLength in units of slots and SI periodicity (T) is units of radio frames from SIB 1

2. The UE determine the SCS of DL BWP in which SI message needs to be acquired.

The SCS of dedicated DL BWP is received in BWP configuration included in dedicated signaling using RRC message (e.g. RRCReconfiguration message). The SCS of initial DL BWP is received in SIB 1.

3. The UE determines w=length of SI window in number of slots in SI-window (1120, 1130). It is equal to si-WindowLength received in SIB 1 if SI message needs to be acquired in initial DL BWP (1110, 1130); Otherwise it is equal to si-WindowLength received in dedicated signaling using RRC message (e.g. RRCReconfiguration message) corresponding to DL BWP in which SI message needs to be acquired (1110, 1120). In an embodiment, if si-WindowLength is not signaled in dedicated signaling using RRC message (e.g. RRCReconfiguration message) corresponding to DL BWP in which SI message needs to be acquired, UE uses si-WindowLength received in system information.

4. The UE determine the SCS (u) of DL BWP in which SI message needs to be acquired (1140).

A. Length of each slot is determined based on SCS of DL BWP in which SI message needs to be received by UE. The slot length for each SCS is pre-defined (1 ms for SCS equals to 15 KHz; 0.5 ms for SCS equals to 30 KHz; 0.25 ms for SCS equals to 60 KHz; 0.125 slots for SCS equals to 120 KHz).

B. The SCS of dedicated DL BWP is received in BWP configuration included in dedicated signaling using RRC message (e.g. RRCReconfiguration message). The SCS of initial DL BWP is received in SIB 1.

5. The UE determines N=number of slots in a radio frame (1150)

6. The UE determines for the concerned SI message, the number n which corresponds to the order of entry in the list of SI messages configured by schedulingInfoList in si-SchedulingInfo in SIB1; (1160)

7. The UE determine the integer value x=(n−1)*w. (1170)

A. This is determined based on SCS of DL BWP in which SI message needs to be received by UE. The SCS of dedicated DL BWP is received in BWP configuration included in dedicated signaling using RRC message (e.g. RRCReconfiguration message). The SCS of initial DL BWP is received in SIB 1.

B. The slot length for each SCS is pre-defined. The number of slots per radio frame for each SCS is pre-defined (10 slots for SCS equals to 15 KHz; 20 slots for SCS equals to 30 KHz; 40 slots for SCS equals to 60 KHz; 80 slots for SCS equals to 120 KHz; 160 slots for SCS equals to 240 KHz).

8. SI window consists of 'w' consecutive slots starting from slot #a, wherein length of each slot is determined according to SCS of DL BWP in which SI message needs to be acquired (1180).

A. The length of each slot is determined based on SCS of DL BWP in which SI message needs to be received by UE. The slot length for each SCS is pre-defined (1 ms for SCS equals to 15 KHz; 0.5 ms for SCS equals to 30 KHz; 0.25 ms for SCS equals to 60 KHz; 0.125 slots for SCS equals to 120 KHz).

B. The SCS of dedicated DL BWP is received in BWP configuration included in dedicated signaling using RRC message (e.g. RRCReconfiguration message). The SCS of initial DL BWP is received in SIB 1.

C. In this method SI window length 'w' in units of slots is same for any DL BWP in which SI message is acquired. However absolute duration in milliseconds can be different for different DL BWP as the duration of each slot depends on SCS which can be different for different BWP.

The UE then acquires the concerned SI message in one or more SI window(s) of SI message.

Embodiment 3—UL Carrier Selection

Embodiment 3-1

Multiple UL carriers (referred a normal uplink carrier (NUL) and supplementary uplink carrier (SUL)) can be supported in a serving cell. When the random access procedure is initiated by UE, it selects one UL carrier and performs PRACH transmission(s) on this UL carrier. If the carrier to use for the Random Access procedure is not explicitly signaled by gNB and if the Serving Cell for the Random Access procedure is configured with supplementaryUplink, the UE select between normal Uplink carrier and supplementary carrier as follows:

1> if nrofSS-BlocksToAverage is not configured in serving cell; or

1> if absThreshSS-BlocksConsolidation is not configured in serving cell; or

1> if the synchronization signal RSRP (SS-RSRP) of SSB with highest SS-RSRP is below or equal to absThreshSS-BlocksConsolidation:

2> RSRP for uplink carrier selection is the SS-RSRP of SSB with highest SS-RSRP.

1> else:

2> RSRP for uplink carrier selection is the linear power scale average of the SS-RSRP of SSB(s) above absThreshSS-BlocksConsolidation, where the total number of averaged SSBs shall not exceed nrofSS-BlocksToAverage.

1> if the RSRP for uplink carrier selection is less than rsrp-ThresholdSSB-SUL:

2> select the SUL carrier for performing Random Access procedure;

1> else:

2> select the NUL carrier for performing Random Access procedure;

In above description SS-RSRP of SSB refers to SS-RSRP of SSB of serving cell. UE measures SS-RSRP over the SSBs transmitted by serving cell.

The parameters nrofSS-BlocksToAverage, absThreshSS-BlocksConsolidation and absThreshSS-BlocksConsolidation can be configured by gNB in system information and/or measurement configuration for one or more frequencies. In RRC idle/inactive state, UE can use the parameters nrofSS-BlocksToAverage, absThreshSS-BlocksConsolidation and absThreshSS-BlocksConsolidation configured in system information corresponding to serving cell. In the RRC Connected state the UE can use the parameters nrofSS-BlocksToAverage, absThreshSS-BlocksConsolidation and absThreshSS-BlocksConsolidation configured in measurement configuration corresponding to serving cell. If measurement configuration does not include these parameters for serving cell, the UE can use the parameters nrofSS-BlocksToAverage, absThreshSS-BlocksConsolidation and absThreshSS-BlocksConsolidation configured in system information corresponding to serving cell. The parameter rsrp-ThresholdSSB-SUL is configured in rach configuration (signaled in SI, dedicated RRC signaling).

Embodiment 3-2

Multiple UL carriers including a NUL and a SUL can be supported in a serving cell. When the random access procedure is initiated by UE, it selects one UL carrier and performs PRACH transmission(s) on this UL carrier. If the carrier to use for the Random Access procedure is not explicitly signaled by gNB and if the Serving Cell for the Random Access procedure is configured with supplementaryUplink, the UE selects between normal Uplink carrier and supplementary carrier as follows:
1> if the SS-RSRP of SSB with highest SS-RSRP is less than rsrp-ThresholdSSB-SUL:
2> select the SUL carrier for performing Random Access procedure;
1> else:
2> select the NUL carrier for performing Random Access procedure,
In the above description SS-RSRP of SSB refers to SS-RSRP of SSB of serving cell. UE measures SS-RSRP over the SSBs transmitted by serving cell.

Embodiment 3-3

Multiple UL carriers including a NUL and a SUL can be supported in a serving cell. When the random access procedure is initiated by UE, it selects one UL carrier and performs PRACH transmission(s) on this UL carrier. If the carrier to use for the Random Access procedure is not explicitly signaled by gNB and if the Serving Cell for the Random Access procedure is configured with supplementaryUplink, the UE select between normal Uplink carrier and supplementary carrier as follows:
1> if the SS-RSRP of SSB selected for determining random access resource for PRACH transmission is less than rsrp-ThresholdSSB-SUL:
2> select the SUL carrier for performing Random Access procedure;
1> else:
2> select the NUL carrier for performing Random Access procedure,
In above description SS-RSRP of SSB refers to SS-RSRP of SSB of serving cell. UE measures SS-RSRP over the SSBs transmitted by serving cell.

Embodiment 3-4

Multiple UL carriers including a NUL and a SUL can be supported in a serving cell. When the random access procedure is initiated by UE, it selects one UL carrier and performs PRACH transmission(s) on this UL carrier. If the carrier to use for the Random Access procedure is not explicitly signaled by gNB and if the Serving Cell for the Random Access procedure is configured with supplementaryUplink, the UE select between normal Uplink carrier and supplementary carrier as follows:

If the UL carrier selection is performed once at the beginning of random access procedure, then UE select the UL carrier as described in method 1. If the UL carrier selection is performed before every RA preamble transmission during the random access procedure, then UE select the UL carrier as described in method 2/3.

Figure 12:
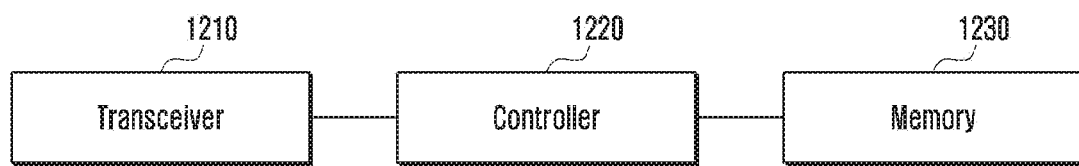
FIG. 12 illustrates a block diagram of a terminal according to an embodiment of the disclosure.

FIG. 12 illustrates a block diagram of a terminal according to an embodiment of the disclosure.

Referring to FIG. 12, a terminal includes a transceiver 1210, a controller 1220 and a memory 1230. The transceiver 1210, the controller 1220 and the memory 1230 are configured to perform the operations of the UE illustrated in the figures, e.g. FIGS. 1 to 11, or described above. Although the transceiver 1210, the controller 1220 and the memory 1230 are shown as separate entities, they may be realized as a single entity like a single chip. Or, the transceiver 1210, the controller 1220 and the memory 1230 may be electrically connected to or coupled with each other.

The transceiver 1210 may transmit and receive signals to and from other network entities, e.g., a BS.

The controller 1220 may control the UE to perform functions according to one of the embodiments described above. The controller 1220 may refer to a circuitry, an ASIC, or at least one processor.

In an embodiment, the operations of the terminal may be implemented using the memory 1230 storing corresponding program codes. Specifically, the terminal may be equipped with the memory 1230 to store program codes implementing desired operations. To perform the desired operations, the controller 1220 may read and execute the program codes stored in the memory 1230 by using a processor or a central processing unit (CPU).

Figure 13:
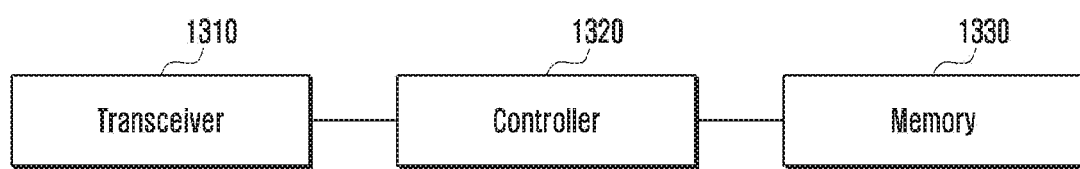
FIG. 13 illustrates a block diagram of a base station according to an embodiment of the disclosure.

FIG. 13 illustrates a block diagram of a BS according to an embodiment of the disclosure.

Referring to FIG. 13, a BS includes a transceiver 1310, a controller 1320 and a memory 1330. The transceiver 1310, the controller 1320 and the memory 1330 are configured to perform the operations of the network (e.g., gNB) illustrated in the figures, e.g. FIGS. 1 to 11, or described above. Although the transceiver 1310, the controller 1320 and the memory 1330 are shown as separate entities, they may be realized as a single entity like a single chip. The transceiver 1310, the controller 1320 and the memory 1330 may be electrically connected to or coupled with each other.

The transceiver 1310 may transmit and receive signals to and from other network entities, e.g., a terminal.

The controller 1320 may control the BS to perform functions according to one of the embodiments described above. The controller 1320 may refer to a circuitry, an ASIC, or at least one processor.

In an embodiment, the operations of the BS may be implemented using the memory 1330 storing corresponding program codes. Specifically, the BS may be equipped with the memory 1330 to store program codes implementing desired operations. To perform the desired operations, the controller 1320 may read and execute the program codes stored in the memory 1330 by using a processor or a CPU.

While the disclosure has been shown and described with reference to various embodiments thereof, it will be understood by those skilled in the art that various changes in form and details may be made therein without departing from the scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a system information block (SIB) including at least one parameter for a paging;
    identifying information indicating a first physical downlink control channel (PDCCH) monitoring occasion of a paging occasion (PO) of a paging frame (PF) for a downlink bandwidth part (BWP); and
    receiving, from the base station on the downlink BWP, a paging message based on a PDCCH addressed to a paging radio network temporary identifier (P-RNTI) by monitoring the PO of the PF based on the at least one parameter,
    wherein the monitoring starts from the first PDCCH monitoring occasion indicated by the information on the PO.

2. The method of claim 1, further comprising:
    receiving, from the base station, a radio resource control (RRC) message configuring the downlink BWP,
    wherein, in case that the downlink BWP is a non-initial downlink BWP, the information indicating the first PDCCH monitoring occasion is included in the RRC message, and
    wherein the at least one parameter includes a paging cycle duration, a number of paging frames in a paging cycle, a number of paging occasions in a paging frame, and a paging frame offset.

3. The method of claim 1, wherein, in case that the downlink BWP is an initial downlink BWP, the information indicating the first PDCCH monitoring occasion is included in the SIB received from the base station, and
    wherein the at least one parameter includes a paging cycle duration, a number of paging frames in a paging cycle, a number of paging occasions in a paging frame, and a paging frame offset.

4. The method of claim 1, wherein the paging message is received on an initial downlink BWP, in case that the terminal is in a radio resource control (RRC) idle state, and
    wherein the paging message is received on a non-initial downlink BWP, in case that the terminal is in an RRC connected state.

5. A method performed by a base station in a wireless communication system, the method comprising:
    transmitting, to a terminal, a system information block (SIB) including at least one parameter for a paging; and
    transmitting, to the terminal on a downlink bandwidth part (BWP), a paging message based on a physical downlink control channel (PDCCH) addressed to a paging radio network temporary identifier (P-RNTI),
    wherein the paging message is transmitted in a paging occasion (PO) of a paging frame (PF) based on the at least one parameter, and a monitoring of the PO starts from a first PDCCH monitoring occasion indicated by information transmitted to the terminal for the downlink BWP.

6. The method of claim 5, further comprising:
    transmitting, to the terminal, a radio resource control (RRC) message configuring the downlink BWP,
    wherein, in case that the downlink BWP is a non-initial downlink BWP, the information indicating the first PDCCH monitoring occasion is included in the RRC message, and
    wherein the at least one parameter includes a paging cycle duration, a number of paging frames in a paging cycle, a number of paging occasions in a paging frame, and a paging frame offset.

7. The method of claim 5, wherein, in case that the downlink BWP is an initial downlink BWP, the information indicating the first PDCCH monitoring occasion is included in the SIB transmitted to the terminal, and
    wherein the at least one parameter includes a paging cycle duration, a number of paging frames in a paging cycle, a number of paging occasions in a paging frame, and a paging frame offset.

8. The method of claim 5, wherein the paging message is transmitted on an initial downlink BWP, in case that the terminal is in a radio resource control (RRC) idle state, and
    wherein the paging message is transmitted on a non-initial downlink BWP, in case that the terminal is in a RRC connected state.

9. A terminal in a wireless communication system, the terminal comprising:
    a transceiver configured to transmit and receive a signal; and
    a controller configured to:
        receive, from a base station, a system information block (SIB) including at least one parameter for a paging,
        identify information indicating a first physical downlink control channel (PDCCH) monitoring occasion of a paging occasion (PO) of a paging frame (PF) for a downlink bandwidth part (BWP), and
        receive, from the base station on the downlink BWP, a paging message based on a PDCCH addressed to a paging radio network temporary identifier (P-RNTI) by monitoring the PO of the PF based on the at least one parameter,
    wherein the monitoring starts from the first PDCCH monitoring occasion indicated by the information on the PO.

10. The terminal of claim 9, wherein the controller is further configured to receive, from the base station, a radio resource control (RRC) message configuring the downlink BWP,
    wherein, in case that the downlink BWP is a non-initial downlink BWP, the information indicating the first PDCCH monitoring occasion is included in the RRC message, and
    wherein the at least one parameter includes a paging cycle duration, a number of paging frames in a paging cycle, a number of paging occasions in a paging frame, and a paging frame offset.

11. The terminal of claim 9, wherein, in case that the downlink BWP is an initial downlink BWP, the information indicating the first PDCCH monitoring occasion is included in the SIB received from the base station, and
   wherein the at least one parameter includes a paging cycle duration, a number of paging frames in a paging cycle, a number of paging occasions in a paging frame, and a paging frame offset.

12. The terminal of claim 9, wherein the paging message is received on an initial downlink BWP, in case that the terminal is in a radio resource control (RRC) idle state, and
   wherein the paging message is received on a non-initial downlink BWP, in case that the terminal is in an RRC connected state.

13. A base station in a wireless communication system, the base station comprising:
   a transceiver configured to transmit and receive a signal; and
   a controller configured to:
      transmit, to a terminal, a system information block (SIB) including at least one parameter for a paging, and
      transmit, to the terminal on a downlink bandwidth part (BWP), a paging message based on a physical downlink control channel (PDCCH) addressed to a paging radio network temporary identifier (P-RNTI),
   wherein the paging message is transmitted in a paging occasion (PO) of a paging frame (PF) based on the at least one parameter, and a monitoring of the PO starts from a first PDCCH monitoring occasion indicated by information transmitted to the terminal for the downlink BWP.

14. The base station of claim 13, wherein the controller is further configured to transmit, to the terminal, a radio resource control (RRC) message configuring the downlink BWP,
   wherein, in case that the downlink BWP is a non-initial downlink BWP, the information indicating the first PDCCH monitoring occasion is included in the RRC message, and
   wherein the at least one parameter includes a paging cycle duration, a number of paging frames in a paging cycle, a number of paging occasions in a paging frame, and a paging frame offset.

15. The base station of claim 13, wherein, in case that the downlink BWP is an initial downlink BWP, the information indicating the first PDCCH monitoring occasion is included in the SIB transmitted to the terminal, and
   wherein the at least one parameter includes a paging cycle duration, a number of paging frames in a paging cycle, a number of paging occasions in a paging frame, and a paging frame offset.

16. The base station of claim 13, wherein the paging message is transmitted on an initial downlink BWP, in case that the terminal is in a radio resource control (RRC) idle state, and
   wherein the paging message is transmitted on a non-initial downlink BWP, in case that the terminal is in a RRC connected state.

* * * * *